(12) United States Patent
Miller et al.

(10) Patent No.: US 6,980,614 B2
(45) Date of Patent: Dec. 27, 2005

(54) SYSTEM AND METHOD FOR SUBBAND BEAMFORMING USING ADAPTIVE WEIGHT NORMALIZATION

(75) Inventors: Thomas W. Miller, Yorba Linda, CA (US); Christopher W. Reed, Benicia, CA (US)

(73) Assignee: Raytheon Company, Waltham, MA (US)

( * ) Notice: Subject to any disclaimer, the term of this patent is extended or adjusted under 35 U.S.C. 154(b) by 754 days.

(21) Appl. No.: 10/047,100

(22) Filed: Jan. 14, 2002

(65) Prior Publication Data

US 2003/0133524 A1 Jul. 17, 2003

(51) Int. Cl.$^7$ .............................. H04B 7/10; H04L 1/02
(52) U.S. Cl. ...................... 375/347; 375/346; 375/347; 455/296; 455/132
(58) Field of Search ............................... 375/346, 347; 455/132, 296

(56) References Cited

U.S. PATENT DOCUMENTS

| | | | |
|---|---|---|---|
| 4,821,037 A | | 4/1989 | Miller et al. |
| 5,216,640 A | | 6/1993 | Donald et al. |
| 5,260,968 A | * | 11/1993 | Gardner et al. ............. 375/347 |
| 5,630,208 A | * | 5/1997 | Enge et al. ................... 455/65 |
| 5,796,779 A | * | 8/1998 | Nussbaum et al. ......... 375/267 |
| 5,831,977 A | * | 11/1998 | Dent .......................... 370/335 |
| 5,933,446 A | * | 8/1999 | Bond et al. ................. 375/130 |
| 6,115,419 A | * | 9/2000 | Meehan ...................... 375/233 |
| 6,151,354 A | * | 11/2000 | Abbey ......................... 375/211 |
| 6,249,251 B1 | * | 6/2001 | Chang et al. ................ 342/378 |
| 6,452,988 B1 | * | 9/2002 | Hayward ..................... 375/346 |
| 2003/0031243 A1 | * | 2/2003 | Meehan et al. ............. 375/233 |

FOREIGN PATENT DOCUMENTS

| | | |
|---|---|---|
| EP | 0 963 003 | 12/1999 |
| EP | 1 162 687 | 12/2001 |
| WO | WO 99 33141 | 7/1999 |

* cited by examiner

Primary Examiner—Stephen Chin
Assistant Examiner—Erin M. File
(74) Attorney, Agent, or Firm—Leonard A. Alkov; Karl A. Vick

(57) ABSTRACT

A beamforming system and method. The inventive beamforming system is adapted for use with an array antenna having a plurality of antenna elements and includes a Fast Fourier Transform (EFT) for transforming a signal received by an antenna into a plurality of frequency subbands. A plurality of adaptive processors are included for performing adaptive array processing on each of the subbands and providing a plurality of adaptively processed subbands in response thereto. A normalizing processor is also included for normalizing the adaptively processed subbands. In the illustrative embodiment, the signal is a Global Positioning System (GPS) signal and a digital multiplier for applying a weight to a respective frequency subband for each of the elements of the array. The weights are chosen to steer a beam in a direction of a desired signal. Normalization involves adjusting the amplitude of one or more of the subbands to remove any bias distortion due to the adaptive processing thereof.

13 Claims, 2 Drawing Sheets

SYSTEM AND METHOD FOR SUBBAND BEAMFORMING USING ADAPTIVE WEIGHT NORMALIZATION

This invention was made with Government support under Contract No. F08630-96-C-0018 awarded by the Department of the Air Force. The Government has certain rights in this invention.

BACKGROUND OF THE INVENTION

1. Field of the Invention

The present invention relates to communications systems. More specifically, the present invention relates to systems and methods for protecting Global Positioning System (GPS) receivers from jamming and interference.

2. Description of the Related Art

The Global Positioning System includes a constellation of satellites that continuously transmit signals relating to the positions thereof and time. When received by a GPS receiver, the signals are processed to provide time of arrival information. The time of arrival of the pulses from each satellite are then used to calculate the location or position of the receiver. Inasmuch as the GPS system is effective for accurate position location, in certain e.g., military, applications, there is a concomitant motivation to jam or interfere with the GPS system. The interfering signal from the jammer is designed to introduce unacceptable error in the GPS position estimate.

Accordingly, countermeasures have been developed to compensate for jamming interference. One widely used countermeasure involves adaptive array processing. These systems generally include an array of antenna elements and a system for processing outputs thereof.

Unfortunately, adaptive array processing systems generally offer a limited capability over a broad bandwidth and, in addition, cause errors in GPS precision when used for interference rejection. That is, a typical GPS receiver operates at approximately 1.5 GHz with a bandwidth of approximately 20 MHz. This relatively wide bandwidth makes it difficult to cancel jamming with conventional adaptive array processing techniques. This is due to the fact that conventional adaptive array processing techniques operate on the basis of a presumption of a very narrow bandwidth e.g., 1 Hz. Therefore, when these techniques are applied to systems with finite bandwidth, they can suffer a significant performance degradation.

These problems are exacerbated when the particularly novel and advantageous technique of band partitioning is employed such as that set forth in U.S. Pat. No. 4,821,037 issued Apr. 11, 1989, to Miller et al, and entitled WIDEBAND ADAPTIVE ARRAY USING THE CHIRP TRANSFORM, the teachings of which are incorporated herein by reference. Band partitioning involves breaking up the GPS frequency band into a number of narrower bandwidth subbands, adaptive array processing the partitioned subbands and reassembly of the subbands to reconstruct the GPS frequency band. This approach significantly improves performance by performing adaptive array processing on many narrow band signals rather than on one wideband signal.

Unfortunately, band partitioning yields a different set of adaptive nulling weights for each frequency band. While effective over the limited subbands, nulling on reassembly of the partitioned bands is problematic. A particularly troublesome aspect of the problem has to do with the fact that when the spectrum is reassembled, a time delay distortion and bias is created which is dependent on the the adaptive array weights, which are in turn dependent on the unknown location of the jammer(s). This is particular problematic inasmuch as time delay is used in the normal course of GPS processing to estimate or determine the position of a receiver. If the time delay were fixed across the constellation, it would be relatively easy to take into account in the process of computing the time delay associated with valid GPS signals. Unfortunately, the delay is a function of the angle of arrival of the satellite signal (i.e., the time delay experienced by the satellite signal is a function of the position of the satellite, and therefore differs among the different satellites). As the location of the jammer is unknown, and furthermore because the jammer spectra tends to vary from antenna element to antenna element due to jammer multipath and small differences between the antenna channels, computation of the time delay bias due to interference from a jammer remains a daunting task in an adaptive array GPS processing system.

Hence, there is a need in the art for a system or method for preserving the precision measurement capability of a GPS receiver when an adaptive processing system or algorithm is used to compensate for jamming interference.

SUMMARY OF THE INVENTION

The need in the art is addressed by the beamforming system and method of the present invention. The inventive beamforming system is adapted for use with an array antenna having a plurality of antenna elements and includes a first arrangement for transforming a signal received by an antenna into a plurality of frequency subbands; a second arrangement for performing adaptive array processing on each of the subbands and providing a plurality of adaptively processed subbands in response thereto; and a third arrangement for normalizing the adaptively processed subbands.

In the illustrative embodiment, the signal is a GPS signal and the arrangement for performing adaptive array processing further includes an arrangement for applying a weight to a respective frequency subband for each of the elements of the array. The weights are chosen to steer a beam in a direction of a desired signal, and to steer a null in the direction of the jammer(s). Normalization involves adjusting the amplitude of one or more of the subbands to remove any time-delay bias or distortion due to the adaptive processing thereof.

Thus, the present invention presents a new way of normalizing adaptive weights computed in a subband adaptive beamformer or null-steerer, for the purpose of compensating for time delay distortion caused by the subband process. The normalization can be implemented at low cost, permits improved cancellation of narrowband interferers, and removes or minimizes the positional errors that would normally be caused by the time delay distortion. In effect, it produces an adaptive weight that provides both wideband and narrowband interference suppression. Narrowband suppression is accomplished by weighting each subband separately. This is done through the use of traditional adaptive array beamforming techniques. Wideband suppression is accomplished by reassembling the subbands following the narrowband operation. The method permits the adaptive cancellation of more narrowband interferers than available degrees-of-freedom.

The present invention provides a simple form of simultaneously implementing two common tasks in a subband beamforming: spatial adaptive beamforming and narrowband interference suppression. Subband adaptive beamforming is a well-known technique of decomposing a high-bandwidth signal into an equivalent set of narrowband signals, and then performing beamforming in each subband. If desired, the high-bandwidth version of the beamformed signal can be recovered by appropriate combination of the subband signals. Narrowband interference suppression is a technique that reduces or removes the components of a signal in one or more narrow bandwidth regions. Many techniques exist for determining which bands to attenuate and how much to attenuate them. Whereas subband processing for wideband signal can be almost distortion free, narrowband excision is not.

Subband adaptive beamforming is conventionally limited by the number of interferers it can cancel. If there are a large number of interferers present in any subband, the beamformer will be unable to cancel them. Narrowband interference suppression cannot null wideband jammers without significantly distorting the desired signals(s).

The present invention provides a method for to inexpensively gain the benefits of both methods. It cancels a large number of wideband and narrowband interferers with minimal distortion to the desired signals. The present invention processes the outputs of the individual band adaptive array processors such that on reassembly into a complete signal, the signal is renormalized such that the bias distortion (delay) is eliminated. The present invention modifies the adaptive processing algorithm so that when it is used to cancel jamming interference, it does not cause increased error in the position estimate.

DESCRIPTION OF THE INVENTION

Illustrative embodiments and exemplary applications will now be described with reference to the accompanying drawings to disclose the advantageous teachings of the present invention.

Figure 1:
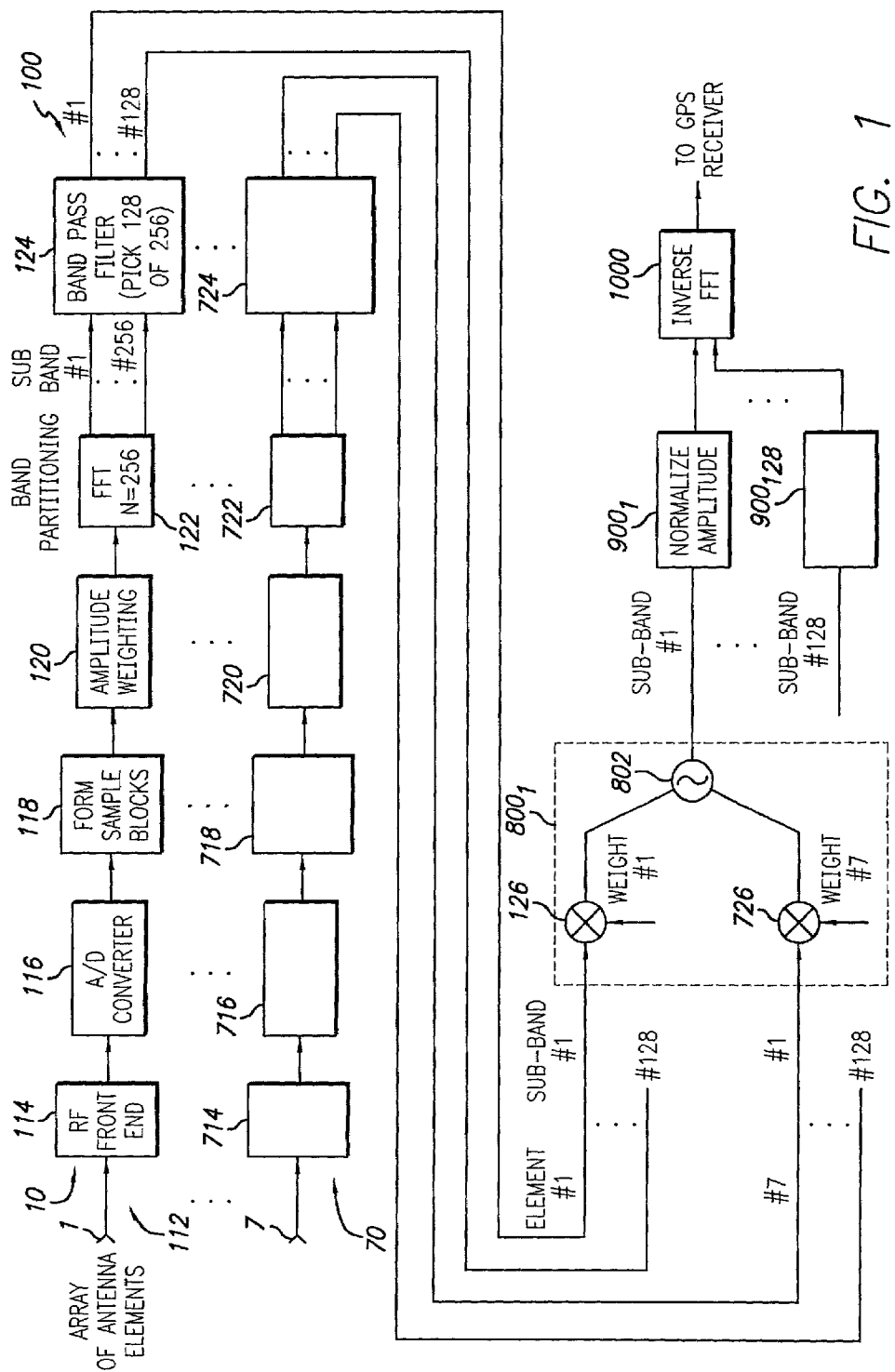
FIG. 1 is a block diagram of an illustrative implementation of a system for subband beamforming using adaptive weight normalization in accordance with the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope FIG. 1 is a block diagram of an illustrative implementation of a system for subband beamforming using adaptive weight normalization in accordance with the teachings of the present invention. The system 100 is adapted for use with an array antenna 112 having a number of elements (m) of which seven are illustrated in FIG. 1 and numbered 1–7. Each element of the array 112 feeds an associated channel of the beamforming system 100. That is, element 1 feeds channel 10, element 2 feeds channel 20, . . . element 7 feeds channel 70. Each of the channels is identical. Accordingly, only channel 10 will be described in detail below. As illustrated in FIG. 1, each channel 10 includes an RF (radio frequency) front end 114 and an analog-to-digital converter 116. The RF front end 114 is of conventional design and construction. The A/D converter 116 digitizes the RF signals received by the front-end 114 and outputs digital words at the systems sample rate to a processor 118. The processor 118 forms a number of n sample blocks for each antenna channel on the digital words output by the A/D converter of a size appropriate for a given application, e.g., n=256, as will be determined by a system designer in accordance with conventional teachings. Next, at step 120, an amplitude weight is applied to each sample. This windowing step preforms the sample blocks for input to a Fast Fourier transformer (FFT) 122 to achieve low frequency sidelobes. This serves to achieve isolation of adjacent filters in the filter bank discussed below. The FFT 122 receives the n sample blocks and provides n outputs. The n FFT outputs are ordered in frequency such that the first output corresponds to the lower edge of the band with a bandwidth of 1/n of the total bandwidth and the second output represents the next adjacent band, and so on up to the nth subband. Those skilled in the art will appreciate that the FFT 122 thus provides a filter bank and each sample represents one output thereof. Effectively, n time samples are fed through a bank of n filters which contiguously fill the entire signal bandwidth (B), where each filter has a bandwidth of B/n, and a single sample is output by each filter. The second set of n time samples will be processed in the same manner to provide the second sample out of each filter. This process is repeated so that each FFT filter outputs a time series at 1/n of the rate B. A subset of n/2 is selected by a bandpass filter 124 to achieve bandwidth reduction as may be permissible in a given application.

The sample blocks, amplitude weighting, Fast Fourier Transform and bandpass filtering operations may be performed with discrete components, a digital signal processor (DSP), field programmable logic array (FPLA), programmable logic device (PLD), or in software with a general purpose processor without departing from the scope of the present teachings as will be appreciated by one of ordinary skill in the art.

For each filter, an adaptive array 800 is provided for each element in the array 112. As is known in the art, a conventional adaptive array combines the outputs of each element of the array 112. In accordance with the present teachings, an adaptive array is provided for each frequency subband output by the FFT 122. Thus, n/2 adaptive arrays are provided of which only one $800_1$, is shown in FIG. 1. The second adaptive array $800_2$ is identical to the first adaptive array $800_1$, with the exception that the second adaptive array $800_2$ selects the second subband of each channel output by the FFT filter thereof. Likewise, the adaptive array number n/2 ($800_{128}$) selects the n/2 filter output.

Each adaptive array $800_x$, where x→1−n/2, multiplies the selected subband sample from each channel by a predetermined weight with a multiplier. That is, a first multiplier 126 is provided in the first adaptive array $800_1$ which multiplies the first subband sample from the first channel 10 with a first weight and provides a first weighted sample in response thereto. A second multiplier 226 (not shown) is provided in the first adaptive array $800_1$. The second multiplier 226 multiplies the first subband sample from the second channel with a second weight and provides a second weighted sample in response thereto, . . . and an m-th multiplier is provided 726, where m=7 in the illustrative embodiment, multiplies the first sample from first channel with an m-th weight and provides an m-th weighted sample in response thereto. As will be appreciated by those skilled in the art, the weights are chosen so that the amplitude and phase of the signals output by each element at each frequency are adjusted to steer a beam in the direction of the source (satellite) of the desired signal.

Figure 2:
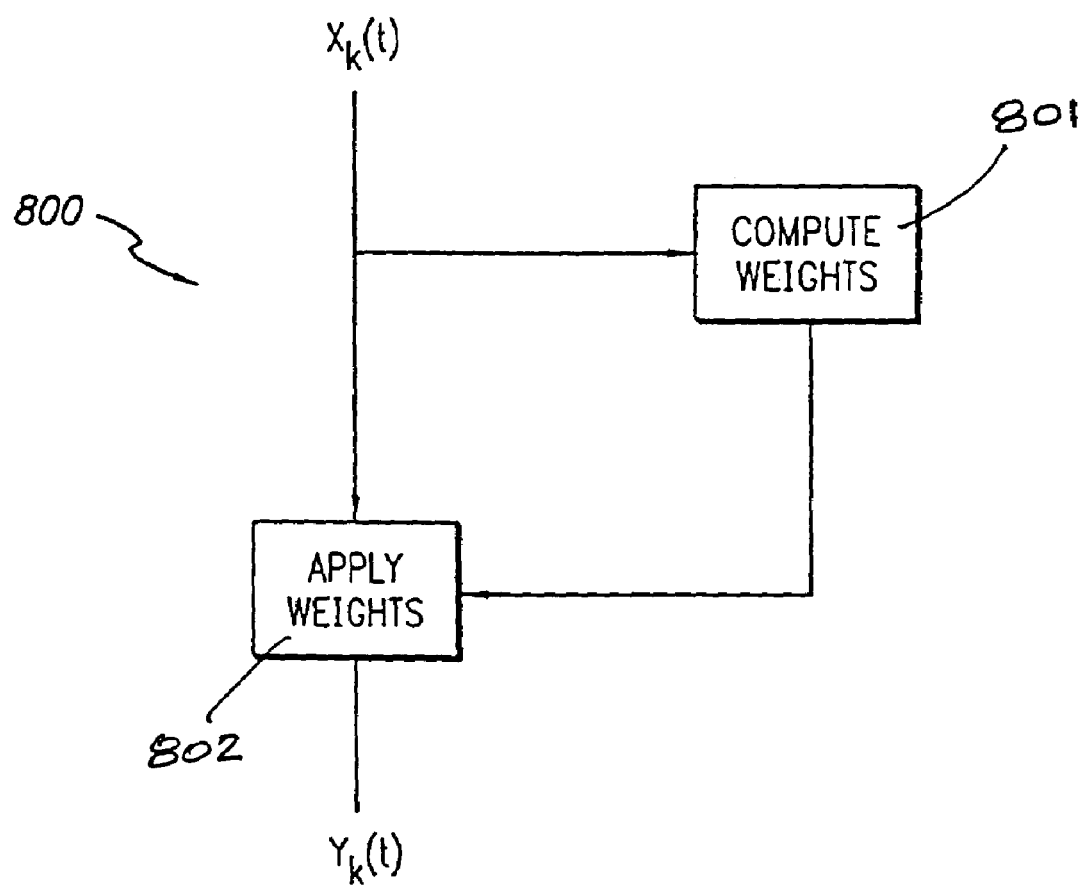
FIG. 2 is a simplified block diagram illustrating the operation of an adaptive beamformer for the k-th subband in accordance with the teachings of the present invention.

FIG. 2 is a simplified block diagram illustrating the operation of an adaptive beamformer 800 for the k-th subband in accordance with the teachings of the present invention. The signal data is used to adaptively compute weights (801) that are then applied by means (802) to the data by:

$$y_k(t)=w^H x_k(t) \quad [1]$$

where $x_k(t)$ is the input signal to the adaptive beamformer, $y_k(t)$ is the output signal, w is an adaptive weight vector and H represents the complex conjugate transpose of a vector. The weights may be computed in a conventional manner by a microprocessor or other digital logic (not shown). The adaptive weights can be chosen to satisfy many possible optimization criteria, such as minimum variance distortionless response (MVDR), maximum signal-to-interference-plus-noise ration (SINR), and means squared error ((MSE). Conventionally, these methods fail, however, if the number of interferers in any subband exceeds the number of available degrees of freedom. However, the present invention provides a technique to automatically account for this.

The MVDR criterion is widely used for adaptive beamforming, including adaptive beamforming in subbands. MVDR minimizes the total output power, subject to the constraint that the desired signal is passed without distortion. Let d be a C×1 vector that represents the response of the antenna array to a desired, continuous wave signal at a fixed frequency and arriving at a fixed direction θ, where θ represents the angle of arrival relative to broadside and C represents the number of antenna elements in the array. The MVDR is computed as:

$$w_{MVDR}=R^{-1}d/d^H R^{-1}d \quad [2]$$

However, as is well known in the art, MVDR fails to provide adequate interference suppression is there are effectively more than C−2 interferers in any subband. The following represents a weight computation method, in accordance with the present teachings, that automatically fixes the output power in each subband:

$$w_{NEW}=\alpha R^{-1}d/(d^H R^{-1}d)^{1/2} \quad [3]$$

where α is a constant that adjusts the power in any subband. The weight computation still attempts to minimize residual interference, but it constrains the output power in any subband to be $|\alpha|^2$. It permits some desired signal attenuation to reach this goal.

Thus, at each frequency, that is, for each subband, bias compensation is effected by forcing the adaptive array gain to be '1' in the direction of the source of the desired signal. This provides for the same gain in the direction of the satellites over all of the subbands and hence, no distortion. The adaptive array 800 effectively steers the received beams and thereby adjusts the pattern of the antenna 112. A summer 802 in each adaptive array adaptive array 800$_x$ combines the weighted samples and provides a single subband output for each filter. Thus, n/2 outputs are provided, one for each filter. Thus, for each subband, an adaptive array output is provided. Those skilled in the art will appreciate that this represents a significant departure from conventional teachings inasmuch as, in accordance with the present teachings, adaptive array processing is performed on frequency subbands whereas, in accordance with conventional teachings, adaptive array processing is performed on the time domain outputs of the antenna elements directly, over the full bandwidth of the received signal.

Next, the received signal is reassembled by first performing a normalization step 900 to ensure that the subband signal amplitudes are substantially equal, and their phase is nominally the same. Normalization is performed in hardware or software in accordance with a conventional normalization algorithm. The normalization process removes any variation between subbands caused by the adaptive arrays, in a selected direction of arrival. By selecting the direction of arrival to be that of the desired signal, normalization has the effect of removing any frequency distortion of the desired signal caused by the preceding adaptive processors, i.e., removal of amplitude and phase variations between the different subbands reduces any distortion (such as time delays) caused by the adaptive arrays. In the normal course of operation, this step is unnecessary. However, in the presence of an interferer, a tone will appear in a subset (e.g., one of the filters) and not in the others, the output of the affected filter(s) will be distorted in amplitude. The distortion will be a function of where the interferer is located physically (i.e., azimuth angle) due to the adaptive array processing step. The inventive system 100 is designed to compensate for this distortion in the direction of the desired signal. This is achieved by normalizing the amplitude of the distorted subband with knowledge of the direction to a given satellite and the correct amplitude of the filter outputs from that satellite. This avoids a disturbance of the passband of the system are per conventional teachings.

Finally, the original signal is reassembled with an inverse FFT 1000 to provide the desired output signal. Hence, the system 100 compensates for the effect of an interferer while the normalization step 900 thereof preserves the desired signal. Consequently, a normalized (time delay bias corrected) signal is steered in the direction of the desired signal.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A beamforming system adapted for use with an array antenna having a plurality of antenna elements, said beamforming system comprising:

first means for transforming a signal received by said antenna into a plurality of frequency subbands, wherein said first means includes a radio frequency receiver, an analog-to-digital converter coupled to the output of said radio frequency receiver and adapted to provide a plurality of samples in response to receipt of said signal, means for forming blocks of said samples, means for amplitude weighting said sample blocks to provide a windowing function with respect thereto, and means for performing a Fast Fourier Transform on said received signal;

second means for performing adaptive array processing on each of said subbands and providing a plurality of adaptively processed subbands in response thereto; and third means for normalizing said adaptively processed subbands.

2. The invention of claim 1 wherein said first means further includes a bandpass filter adapted to filter the output of said means for performing a Fast Fourier Transform on said received signal.

3. The invention of claim 1 further including means for performing an inverse Fast Fourier Transform on said received signal.

4. A beamforming system adapted for use with a GPS receiver and an array antenna having a plurality of antenna elements, said beamforming system comprising:
   an FFT transforming a signal received by said antenna into a plurality of frequency subbands;
   an adaptive array processor arrangement for processing on each of said subbands and providing a plurality of adaptively processed subbands in response thereto, said arrangement including an adaptive array processor for each frequency subband, each of said adaptive array processors including means for applying a weight to a respective frequency subband for each of said elements of said array, said weights being chosen to steer abeam in a direction of a desired signal, wherein each of said adaptive array processors further includes means for combining the outputs of said means for applying a weight to a respective frequency subband for each of said elements of said array to provide a single output signal for each subband; and
   a processor for adjusting the amplitude of one or more of said subbands.

5. A beamforming system adapted for use with an array antenna having a plurality of antenna elements, said beamforming system comprising:
   first means for transforming a signal received by said antenna into a plurality of frequency subbands;
   second means for performing adaptive array processing on each of said subbands and providing a plurality of adaptively processed subbands in response thereto, wherein said second means includes an adaptive array processor for each frequency subband and each of adaptive array processors includes means for applying a weight to a respective frequency subband for each of said elements of said array, wherein said weights are chosen to steer a beam in a direction of a desired signal; and
   third means for normalizing said adaptively processed subbands.

6. The invention of claim 5 wherein each of said adaptive array processors further includes means for combining the outputs of said means for applying a weight to a respective frequency subband for each of said elements of said array to provide a single output signal for each subband.

7. The invention of claim 6 wherein said third means includes means for adjusting the amplitude of one or more of said subbands.

8. A beamforming system adapted for use with a GPS receiver and an array antenna having a plurality of antenna elements, said beamforming system comprising:
   an FT transforming a signal received by said antenna into a plurality of frequency subbands;
   an adaptive array processor arrangement for processing on each of said subbands and providing a plurality of adaptively processed subbands in response thereto, said arrangement including an adaptive array processor for each frequency subband, each of said adaptive array processors including means for applying a weight to a respective frequency subband for each of said elements of said array, said weights being chosen to steer a beam in a direction of a desired signal, wherein said means for applying a weight includes
       means for performing a Fast Fourier Transform on said received signal,
       a radio frequency receiver,
   an analog-to-digital converter coupled to the output of said radio frequency receiver and adapted to provide a plurality of samples in response to receipt of said signal,
       means for forming blocks of said samples,
       means for amplitude weighting said sample blocks to provide a windowing function with respect thereto; and
   a processor for adjusting the amplitude of one or more of said subbands.

9. The invention of claim 8 wherein said means for applying a weight further includes a bandpass filter adapted to filter the output of said means for applying a weight for means for performing a Fast Fourier Transform on said received signal.

10. The invention of claim 8 further including means for performing an inverse Fast Fourier Transform on said received signal.

11. A beamforming method adapted for use with an array antenna having a plurality of antenna elements, said beamforming method including the steps of:
    transforming a signal received by said antenna into a plurality of frequency subbands;
    performing adaptive array processing on each of said subbands and providing a plurality of adaptively processed subbands in response thereto and applying a weight to a respective frequency subband of each of said elements of said array;
    choosing said weights to steer a beam in a direction of a desired signal; and
    normalizing said adaptively processed subbands.

12. The invention of claim 11 further including the step of combining the outputs of said step of applying a weight to a respective frequency subband for each of said elements of said array to provide a single output signal for each subband.

13. The invention of claim 11 wherein said step of normalizing further includes the step of adjusting the amplitude of one or more of said subbands.

* * * * *